United States Patent [19]

Lankston

[11] Patent Number: 4,736,482

[45] Date of Patent: Apr. 12, 1988

[54] PIPELINE PIG BYPASSING ASSEMBLY

[75] Inventor: Robert J. Lankston, Shawnee, Kans.

[73] Assignee: Taylor Forge Engineered Systems, Inc., Paola, Kans.

[21] Appl. No.: 886,190

[22] Filed: Jul. 16, 1986

[51] Int. Cl.⁴ .............................................. B08B 9/04
[52] U.S. Cl. .............................. 15/104.062; 137/268
[58] Field of Search .................... 15/104.06 A; 134/8; 73/3; 137/268

[56] References Cited

U.S. PATENT DOCUMENTS

| | | | |
|---|---|---|---|
| 3,224,247 | 12/1965 | Barrett, Jr. | 15/104.06 A X |
| 3,387,483 | 6/1968 | Van Arsdale | 15/104.06 A X |
| 3,664,356 | 5/1972 | Grove et al. | 15/104.06 A X |
| 3,678,730 | 7/1972 | Barrett, Jr. | 15/104.06 A X |

Primary Examiner—Edward L. Roberts
Attorney, Agent, or Firm—Hovey, Williams, Timmons & Collins

[57] ABSTRACT

A pipeline pig bypassing assembly is provided which remvoes a pipe pig from a pipeline system and which reintroduces a pig into the system when a second pig enters the assembly. Preferably, the bypassing assembly includes a tubular receiving means connected between two pipes of a pipeline system, a diverter for diverting a pig moving through a first pipe into the assembly, and releasing means for retaining a pipe pig in the receiver and for releasing the pig into a second pipe when a second pig enters the assembly. The receiving means sealingly engages a pipe pig therein to prevent passage therethrough of the material being transported by the pipeline system.

14 Claims, 2 Drawing Sheets

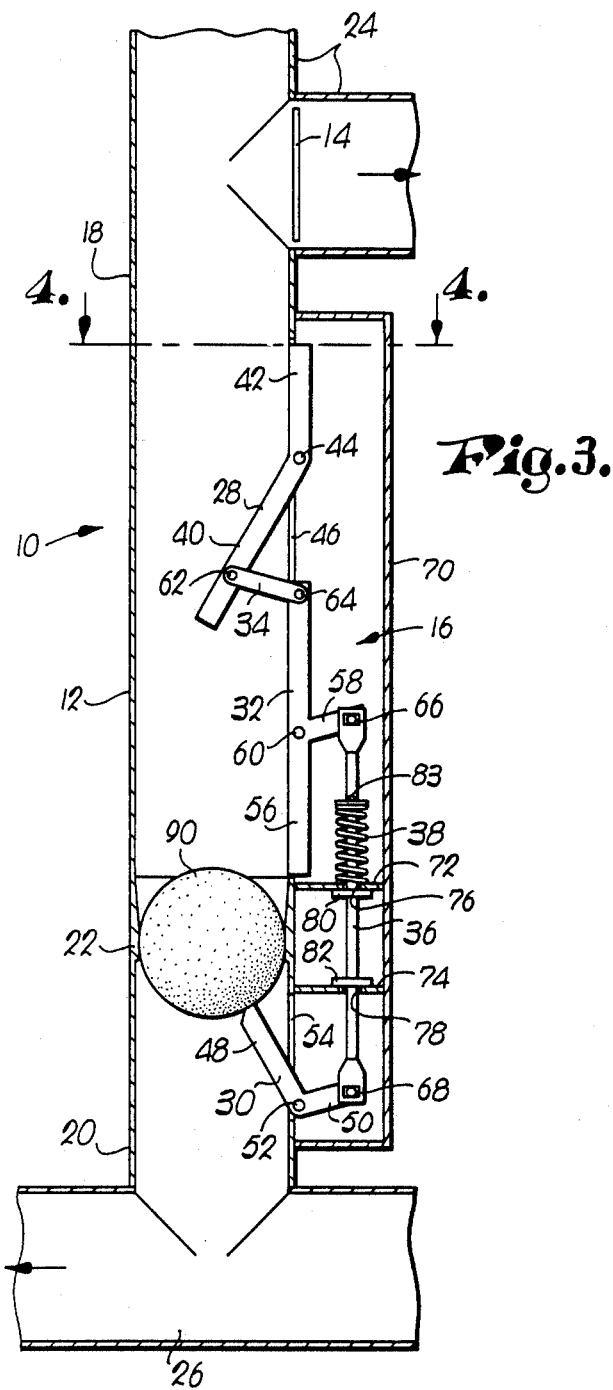
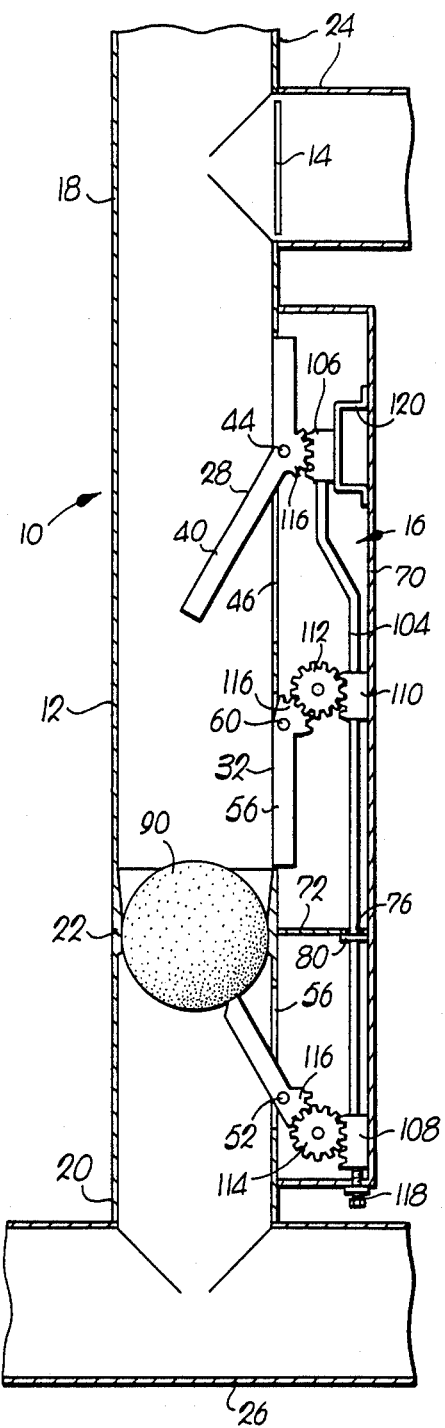
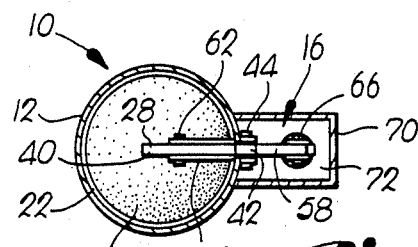

PIPELINE PIG BYPASSING ASSEMBLY

BACKGROUND OF THE INVENTION

1. Field of the Invention

This invention relates to pipeline systems and more particularly to an assembly for receiving and bypassing pipeline "pigs" inserted into the pipeline system. Pipeline pigs are used for cleaning the interior of a pipe, separating different materials being pumped through the pipe, or the like. More particularly, this invention relates to an assembly for bypassing pipeline pigs around a "slug" catching apparatus which receives liquid accumulations in a natural gas pipeline which are scavenged by the pipeline pig moving therethrough.

2. Description of the Prior Art

Recovery of offshore natural gas involves the use of an offshore drilling platform for the drilling of natural gas wells. After the well is drilled, a pipeline connects the well head to the platform. Compressors mounted on the platform compress the natural gas and deliver it via another pipeline along the ocean floor to a centrally located recovery platform. Some subsea wells are drilled from a drilling ship and no platform is used. A pipeline connects the wellhead along the sea floor directly to a recovery platform, the wellhead pressure being sufficient to convey the natural gas without the need for compressors.

Typically, a number of drilling platforms supply natural gas via individual pipelines to the recovery platform. The recovery platform again recompresses the natural gas and conveys it via another pipeline to shore-based handling facilities.

Natural gas exiting a wellhead typically has a temperature in excess of 100° F. As the natural gas travels along the pipeline from the drilling platform to the recovery platform, the relatively colder sea water cools the natural gas. As the natural gas cools, various components condense into liquid form. As these condensed products accumulate in the pipeline, the flow of the vapor components of the natural gas is reduced.

When the flow of natural gas through the pipeline is reduced to an unacceptable level, it becomes necessary to remove the condensibles from the pipeline. This is accomplished by inserting a pipe pig into the drilling platform end of the pipeline. A pipe pig is typically a spherical, hollow, neoprene body filled with antifreeze and having a diameter approximately equal to the interior diameter of the pipeline. The pressure generated by the compressors on the drilling platform or the natural wellhead pressure of the gas moves the pig along the pipeline toward the recovery platform. The pig is resilient and flexible and the pressure behind the pig forces it into tight contact with the interior walls of the pipeline. As the pig moves along the pipeline it pushes the accumulated liquid or "slug" before it. A slug catcher on the recovery platform separates the accumulated liquid from the natural gas and stores the liquid. Other types of pipe pigs are sometimes used—for example, a bullet-shaped pig with concentric seal rings.

Typically, the quantity of accumulated liquid is so great that the slug catcher fills up before the pig has completely emptied the pipeline of liquid. This accumulation of liquid necessarily halts the transport of natural gas until the liquid can be processed and separately pumped to shore. The processing often takes 24 to 48 hours, during which time natural gas production is halted.

A recovery platform big enough to hold additional or larger slug catchers is prohibitively expensive. One prior art solution involves placement of a very large slug catcher on the ocean floor in the vicinity of the recovery platform. When an ocean floor based slug catcher is used, divers must be sent down to the ocean floor to recover the pig from the pipeline. As one skilled in the art will appreciate, this can be a dangerous, expensive, and time-consuming activity.

SUMMARY OF THE INVENTION

The pipeline pig bypassing assembly of the present invention solves the problems as outlined above. That is to say, the pig bypassing assembly allows the use of a large ocean floor based slug catcher by providing the means for bypassing the pig around the slug catcher for removal of the pig conveniently on the recovery platform.

The pipeline pig bypassing assembly broadly comprises means for receiving a pipe pig therewithin from a first pipe of the system; and a releasing means coupled with the receiving means for releasably holding the pipe pig within the receiving means and for selectively releasing the pipe pig into a second pipe of the piping system from the receiving means.

More particularly, the releasing means simultaneously releases a first pig from the receiving means as a second pipe pig is received therein. Preferably, the receiving means includes a tubular body having ends respectively communicating with the first pipe and the second pipe of the system, the pig bypass assembly receiving pipe pigs from the first pipe and introducing pipe pigs contained therewithin into the second pipe. Preferably, the assembly includes a diverting means which advantageously includes scraper bars coupled in the first pipe adjacent to and downstream of the receiving means, the scraper bars being pervious to material being transported through the pipeline system and impervious to the pipe pig.

In preferred forms, the releasing means includes first and second pivotally mounted, interconnected arms, the first arm being pivotally movable between a receiving position and an actuating position when a pipe pig enters the receiving means, the second arm being pivotally movable between a holding position and a releasing position whereby a pipe pig is retained in the receiving means when the second arm is in the holding position; the linkage also includes coupling means interconnecting the first and second arms for moving the second arm from the holding position to the releasing position when the first arm moves from the receiving position to the actuating position, the first and second arms extending within the receiving means for contact with the pipe pig contained therein when the arms are in the respective receiving and retaining positions.

Preferably, the coupling means includes a third, pivotally mounted arm interposed between the first and second arms, the third arm being pivotally movable between an operating position and a reset position, the third arm being disposed within the receiving means for contact with the pipe pig contained therein when the third arm is in the operating position, the third arm being movable from the operating position to the reset position when the pipe pig contained within the receiving means contacts the third arm, the coupling means interconnecting the third arm and the first and second arms for moving the first arm from the actuating position to the receiving position and for moving the second arm from the releasing position to the retaining position when the third arm moves from the operating position to the reset position.

Advantageously, the receiving means includes a tubular body essentially the same diameter as a pig whereby a pig within the receiving means substantially seals it against movement of material therethrough. Also, the first arm desirably includes an end portion for preventing movement of a pipe pig therebeyond when the first arm is in the actuating position.

In the first embodiment of the invention, a spring, connected with the releasing means, normally urges the first arm into its receiving position, the second arm into its reset position, and the third arm to its holding position. In the second embodiment, the first, second and third arms are interconnected by rack and pinion gearing means.

BRIEF DESCRIPTION OF THE DRAWINGS

FIG. 3 is a sectional view of the first embodiment of the bypassing assembly;

FIG. 4 is a view of the pig bypassing assembly taken along lines 4—4 of FIG. 3;

FIG. 5 is a sectional view of the second embodiment of the pig bypassing assembly;

DESCRIPTION OF THE PREFERRED EMBODIMENTS

Figure 1:
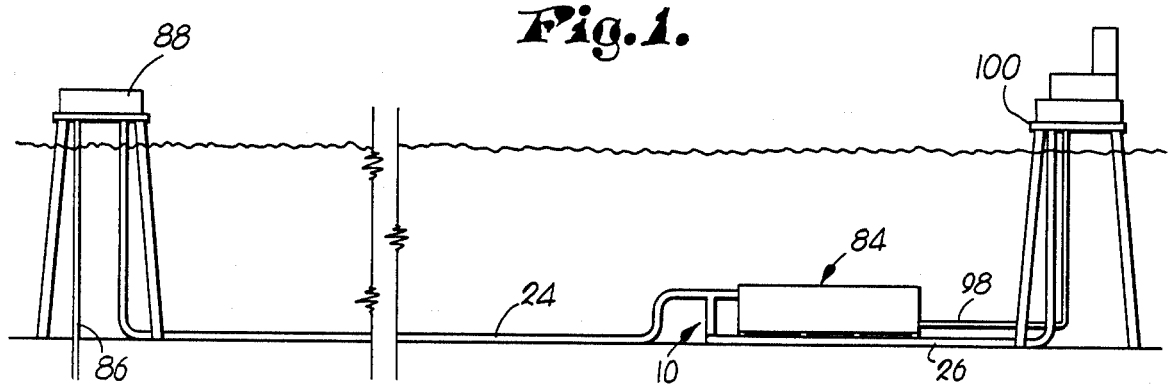
FIG. 1 is a partial schematic representation of a pipeline system.

Referring now to FIGS. 3 and 4, the first embodiment of the preferred pipeline pig bypassing assembly 10 broadly includes tubular pipe receiver 12, pipe pig diverter 14, and holding and releasing linkage 16.

Tubular receiver 12 is advantageously constructed from piping of the same type and size as that used in the piping system for transporting natural gas or other pipe transportable material such as liquids, solids in a slurry, pumpable solids or the like. Receiver 12 includes pig receiving end 18, pig exit end 20, and sealing ring 22. Receiving end 18 is preferably welded to and in communication with entry pipe 24. Exit end 20 is welded to and in communication with discharge pipe 26.

Diverter 14 is preferably scraper bars including a plurality of steel rods, the ends of which are welded to the interior of entry pipe 24, perpendicular to the line of axis thereof, and adjacent receiving end 18 on the downstream side of material flow through pipe 24.

Operating linkage 16 includes first arm 28, second arm 30, third arm 32, connecting link 34, connecting rod 36, and spring 38.

First arm 28 includes receiving leg 40 and integral blocking leg 42 configured in an open V shape. The juncture of legs 40 and 42 includes pivot pin 44 therethrough mounted to the outside wall of receiver 12.

Figure 6:
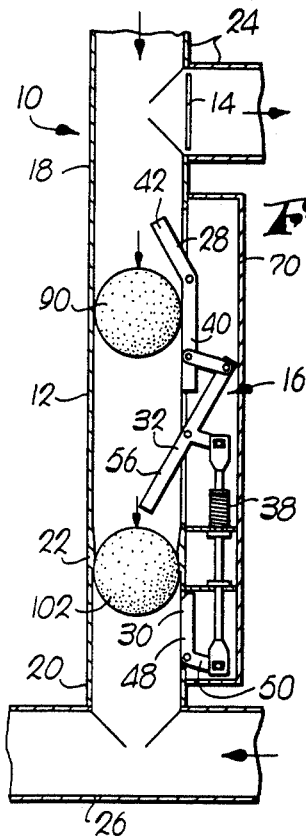
FIG. 6 is a reduced view, similar to FIG. 3, illustrating the operation of the linkage as a pig enters the assembly.

First arm 28 pivots about pivot pin 44 from a receiving position as shown in FIG. 4 to the actuating position as shown in FIG. 6 through a slot 46 longitudinally defined in the wall of receiver 12.

Second arm 30 includes holding leg 48 and integral extension leg 50 together presenting an open V-shaped configuration as shown in FIG. 3. Second arm 30 is pivotally mounted to the exterior wall of receiver 12 near exit end 20 by pivot pin 52. Second arm 30 moves about pivot pin 52 from the holding position shown in FIG. 3 to the releasing position shown in FIG. 6 through slot 54 defined longitudinally in the wall of receiver 12.

Third arm 32 includes operating leg 56 and reset extension leg 58 integrally joined with operating leg 56 to present a generally T-shaped configuration as shown in FIG. 3. Third arm 32 is pivotally mounted to the exterior wall of receiver 12 by pivot pin 60 disposed through arm 32 at the juncture of operating leg 56 and extension leg 58. Third arm 32 rotates about pin 60 from the reset position as shown in FIG. 3 to its operating position as shown in FIG. 6 through slot 46.

Connecting link 34 is pivotally connected to receiving leg 40 of first arm 28 and to the upper end of operating leg 56 of third arm 32, respectively, by pins 62 and 64.

Connecting rod 36 pivotally interconnects the respective outboard ends of extension leg 58 of third arm 32 and extension leg 50 of second arm 30 by means of pins 66 and 68, respectively.

Advantageously, linkage 16 is enclosed by linkage enclosure 70 which presents a U-shaped configuration having closed ends which is welded to the exterior of receiver 12 as best shown in FIGS. 3 and 4. Linkage enclosure 70 also includes transverse support walls 72 and 74.

Connecting rod 36 extends through respective apertures 76 and 78 in walls 72 and 74. Respective connecting rod seals 80 and 82 seal apertures 76 and 78 against passage of liquid therethrough.

Spring 38 is interposed and compressed between cylindrical, spring retainer 83 extending laterally through rod 36 and wall 72 to thereby bias connecting rod 36 upwardly as shown in Fig. 3.

Figure 2:
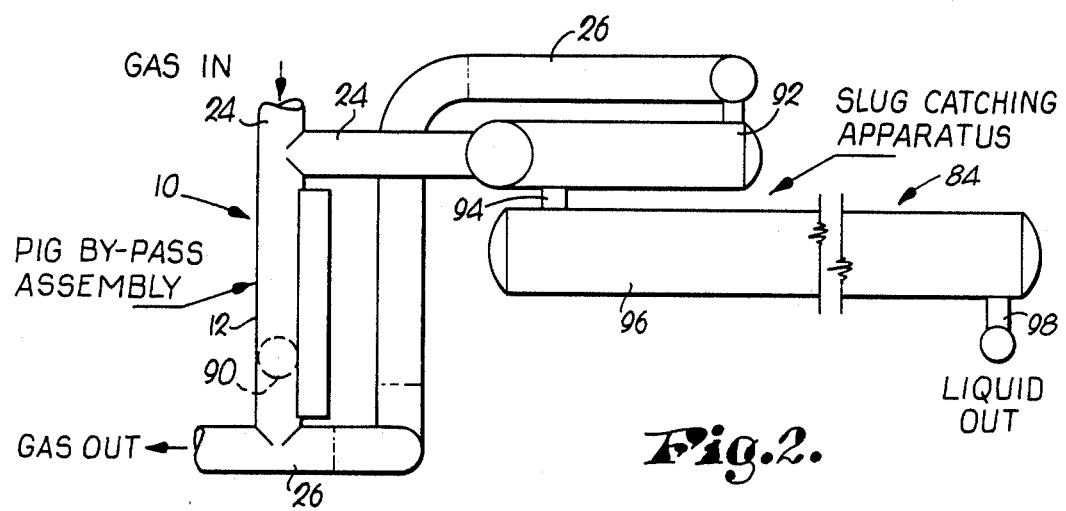
FIG. 2 is a schematic representation of the pig bypass assembly in parallel with a slug catching apparatus.

In use, pipeline pig bypass assembly 10 is advantageously connected parallel with a slug catching apparatus 84 (FIGS. 1 and 2) which is part of an offshore pipeline system. In such a system, natural gas travels from the wellhead through pipeline 86 to the drilling platform 88 which reinserts the natural gas under pressure into entry pipe 24. In some installations, a drilling platform is not used and natural gas flows directly from the sea floor wellhead into entry pipe 24 under the naturally occurring pressure of the gas.

When the level of condensibles in pipe 24 reaches an unacceptable level, the pipe pig 90 is inserted in pipe 24 as near the wellhead as practical. As pig 90 travels through pipeline 24 under the pressure of natural gas behind it, pig 90 pushes liquid ahead of it through pipe 24 into separator 92 of slug catching apparatus 84. In separator 92, liquid accumulation under the influence of gravity flows via pipe 94 into accumulator 96 which is large enough to store the amount of liquid accumulated by the action of pig 90. The liquid in accumulator 96 moves under the influence of natural gas pressure through liquid pipe 98 to recovery platform 100 for further processing and pumping.

The natural gas separated from the liquid in separator 92 enters discharge pipe 26 to recovery platform 100 for distribution to onshore facilities.

When pipe pig 90 reaches diverter 14, it is blocked by diverter 14 form further passage therebeyond into slug catching apparatus 84. Pig 90 then moves downwardly as viewed in FIG. 3 into contact with receiving leg 40 of first arm 28. It is to be understood that, in this particular embodiment, pig 90 moves downward naturally under the influence of gravity but also under the differential pressure existing between pipelines 24 and 26 which is caused by the pressure drop normally occurring across slug catching apparatus 84. The natural momentum of pig 90 will often carry it into receiver 12 without ever contacting diverter 14. Diverter 14 is preferably provided to ensure that pig 90 does not enter slug catching apparatus 84.

Continued downward movement of pig 90 causes first arm 28 to rotate counterclockwise to its actuating position as shown in FIG. 6. As first arm 28 rotates, connecting link 34 causes third arm 32 to rotate clockwise from its reset position to its operating position also as shown in FIG. 6.

The clockwise rotation of third arm 32 moves the outboard end of reset extension leg 58 downwardly which also causes connection rod 36 to move downwardly against the bias of spring 38.

As connecting rod 36 moves downwardly, its interconnection with extension leg 50 causes second arm 30 to rotate clockwise from its holding position to its releasing position. In the releasing position, a second pig 102 having previously been received by assembly 10, is free to move downwardly into discharge pipe 26 for transport to recovery platform 100 where it is removed. Proportionately, the distance between assembly 10 and recovery platform 100 is very small compared to the distance between drilling platform 86 and assembly 10 and any accumulation of liquid beyond assembly 10 is also proportionately small and is easily handled by the equipment on platform 100.

Figure 7:
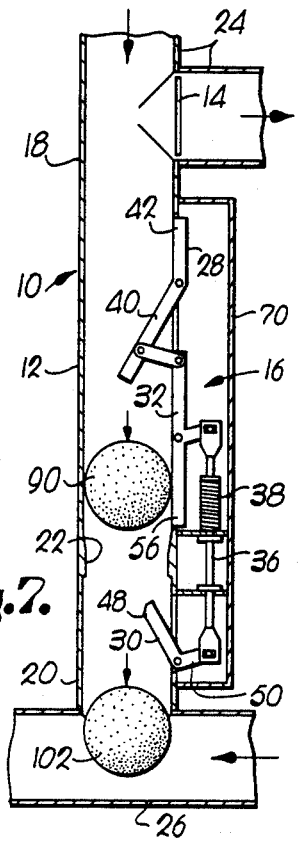
FIG. 7 is a view similar to FIG. 3 illustrating the operation of the linkage as a pig progresses through the assembly.

As pipe pig 90 continues to move downwardly, it contacts third arm 32 in its operating position as shown in FIG. 6 which causes third arm 32 to rotate counterclockwise to its reset position as shown in FIG. 7. The counterclockwise rotation of third arm 32 from its operating position to its reset position places first arm 28 in its receiving position by means of connecting link 34, and causes second arm 30 to rotate to its holding position by means of connecting rod 36. The counterclockwise rotation of third arm 32 is aided by the bias of spring 38.

Figure 8:
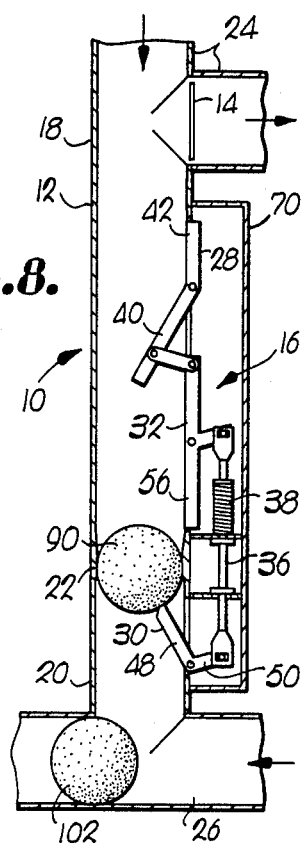
FIG. 8 is a view similar to FIG. 3 illustrating the introduction of a pig into the pipeline system as a second pig is held within the assembly.

Pipe pig 90 continues to move downwardly until it encounters holding leg 48 of second arm 30 which holds pig 90 within receiver 12 as shown in FIG. 8. In the holding position, sealing ring 22 and pig 90 are in snug sealing engagement to prevent natural gas and accumulated liquid from bypassing slug catching apparatus 84. Likewise, rod seals 80 and 82 prevent natural gas and liquid from passing through apertures 76 and 78.

FIG. 6 illustrates another provision of assembly 10 in that blocking leg 42 of first arm 28 prevents the entry of a second pig into assembly 10 until pig 90 has moved third arm 32 to its reset position.

A second embodiment of assembly 10 is shown in FIG. 5. Similar component parts are numbered the same as with the first embodiment.

The primary difference between the second embodiment and the first embodiment involves linkage 16 and in particular the means by which arms 28, 30 and 32 are operably interconnected. In the second embodiment, linkage 16 includes operating rod 104, gear racks 106, 108 and 110, and gear pinons 112, 114. Additionally, arms 28, 30 and 32 integrally include respective gear teeth 116 circumferentially disposed in the vicinity of pins 44, 52 and 60.

Gear racks 106–110 are fixedly attached to operating rod 104. Additionally, downward movement is limited by adjustable threaded bolt 118 disposed in the bottom of enclosures 70.

As shown in FIG. 5, operating rod 104 is configured to present an offset so that gear rack 106 engages gear teeth 116 of first arm 28. Spacer 120 slidably engages the outboard side of gear rack 106 to hold it in engagement with gear teeth 116. Pinion 112 intercouples gear teeth 116 of third arm 32 with rack 110 and pinion 114 interconnects gear teeth 116 of second arm 30 with rack 108.

In the operation of the second embodiment of FIG. 5, counterclockwise movement of first arm 28 from its receiving position to its actuating position, causes upward movement of operating rod 104. When rod 104 moves upwardly, rack 110 causes clockwise movement of pinion 112 which in turn causes counterclockwise rotation of third arm 32 from its reset position to its operating position. Also, when rod 104 moves upwardly, rack 108 causes counterclockwise movement of pinion 114 which in turn causes clockwise movement of second arm 30 from its holding position to its releasing position.

Conversely, movement of third arm 32 from its operating position to its reset position causes first arm 28 to move to its receiving position and causes second arm 30 to move to its holding position. Thus, the relative movement of arms 28, 30 and 32 of the second embodiment is the same as that for the first embodiment.

As one skilled in the art will appreciate, many variations of the preferred embodiments herein illustrated are possible which are still contemplated by the claims of the present invention. For example, holding and releasing linkage 16 could include a plurality of hydraulically, pneumatically or electrically operated and actuated arms to provide the same equivalent structure in allowing a pipe pig to bypass a slug catcher while preventing the bypass of natural gas and liquid and which also allows the delivery of a pipe pig to a recovery platform. Additionally, the use of the pig bypassing assembly is not limited to applications involving natural gas, but is useful in any application where it is desired to remove a pipe pig from the active portions of a pipeline system such as when the system is transporting other types of gases, liquids, slurries, or pumpable solids.

Finally, the pipeline pig bypassing assembly described herein is not limited to the use of spherical pigs but can be used with differently shaped pigs as well.

Having thus described in detail the preferred embodiments of the present invention, what is claimed as new and desired to be secured by Letters Patent is:

1. In a piping system for delivery of material through a pipe under pressure, the system being capable of moving a pipe pig through the piping system, a pipe pig bypassing assembly comprising:

means for receiving a pipe pig therewithin from a first pipe of the system;

releasing means coupled with said receiving means, for releasably holding a pipe pig within said receiving means for for selectively releasing a pipe pig into a second pipe of the piping means from said receiving means;

said releasing means including first and second, pivotally mounted, interconnected arms, said first arm being pivotally movable between a receiving position and an actuating position, said first arm including structure for moving from said receiving position to said actuating position when a pipe pig enters said receiving means, said second arm being pivotally movable between a holding position and a releasing position, said second arm including structure for retaining a pipe pig in said receiving means when said second arm is in said holding position, said releasing means also including coupling means interconnecting said first and second arms for moving said second arm from said holding position to said releasing position when said first arm moves from said receiving position to said actuating position; and said first and second arms extending within said receiving means for contact with a pipe pig contained therein when said arms are in said respective receiving and retaining positions.

2. The invention as set forth in claim 1, said coupling means including a third, pivotally mounted arm interposed between said first and second arms;

said third arm being pivotally movable between an operating position and a reset position, said third arm being disposed within said receiving means for contact with a pipe pig contained therein when said third arm is in said operating position, said third arm being movable from said operating position to said reset position when a pipe pig contained within said receiving means contacts said third arm, said coupling means interconnecting said third arm and said first and second arms for moving said first arm from said actuating position to said receiving position and for moving said second arm from said releasing position to said holding position when said third arm moves from said operating position to said reset position.

3. The invention as set forth in claim 2, said first arm including an end portion for preventing movement of a pipe pig therebeyond when said first arm is in said actuating position.

4. The invention as set forth in claim 2, there being a spring connected with said releasing means for normally urging said first arm to its receiving position, said second arm to its reset position and said third arm to its holding position.

5. The invention as set forth in claim 2, said coupling means including gear means for operably interconnecting said arms.

6. A pipeline pig bypassing assembly for bypassing pipeline pigs around a portion of a pipeline from a first pipeline location to a second downstream pipeline location, said assembly comprising:

receiver means, including a receiving end for coupling with the pipeline at the first location and an exit end for coupling with the pipeline at the second location, for receiving pipeline pigs therein from the pipeline at the first location through said receiving end, for holding pigs therein, and for releasing pigs therefrom into the pipeline at the second location through said exit end; and holding and releasing means operably coupled with said receiver means for releasing a pig from said body through said exit end into the pipeline at the second location simultaneously upon reception of a pig into said body through said receiving end from the pipeline at the first location, said holding end releasing means including:

a shiftable holding and releasing mechanism shiftable between holding and releasing positions for holding a pig within said body when in said holding position and for releasing a pig through said exit end into the pipeline at the second location when in said releasing position, and actuating means mechanically coupled with said mechanism for shifting said mechanism from said holding position to said releasing position simultaneously upon reception of a pig into said body through said receiving end whereby a pig previously held within said body is simultaneously released through said exit end into the pipeline at the second location.

7. The assembly as set forth in claim 6, said receiver means including a tubular pipe.

8. The assembly as set forth in claim 7, further including an annular sealing ring coupled with the interior of said pipe for circumferentially engaging the exterior surface of a pipe pig when being held in said receiving means in order to provide a fluid seal and thereby prevent fluid transmission through said assembly when a pipeline pig is held therein.

9. The assembly as set forth in claim 6, further including diverter means interposed in the pipeline at the first location adjacent to and downstream of said receiving end for preventing passage of a pipeline pig through the pipeline beyond the said diverter means and for diverting pigs into said assembly from the pipeline.

10. The assembly as set forth in claim 9, said diverter means including scraper bars impervious to a pie pig.

11. The assembly as set forth in claim 6, said holding end releasing mechanism including a shiftable arm extending within said receiver means when in said holding position for engaging a pipe pig therein in order to hold the pig within said receiver means and being retracted from within said receiver means when in said releasing position in order to release a pipeline pig into the pipeline.

12. The assembly as set forth in claim 6, said actuating means including a shiftable actuating arm shiftable between an extended position wherein said actuating arm extends within said diverting means and an actuating position wherein said actuating arm is retracted from within said receiver means, said actuating arm being shiftable from said extended position to said actuating position upon impingement of a pipeline pig thereagainst, said actuating arm shifting said holding and releasing mechanism from said holding position to said releasing position when shifting from said extending position to said actuating position.

13. The assembly as set forth in claim 6, said holding and releasing means including means yieldably biasing said mechanism toward said holding position.

14. The assembly as set forth in claim 6, said assembly further including an enclosure means for preventing contact between said holding and releasing means and the environment surrounding said assembly.

* * * * *